(12) United States Patent
Suzuki et al.

(10) Patent No.: US 7,262,956 B2
(45) Date of Patent: Aug. 28, 2007

(54) BATTERY PACK AND METHOD FOR MANUFACTURING THE SAME

(75) Inventors: Fumihiko Suzuki, Fukushima (JP); Takayuki Aita, Fukushima (JP); Hiroaki Kanno, Fukushima (JP); Kouji Watanabe, Fukushima (JP)

(73) Assignee: Sony Corporation, Tokyo (JP)

( * ) Notice: Subject to any disclaimer, the term of this patent is extended or adjusted under 35 U.S.C. 154(b) by 275 days.

(21) Appl. No.: 10/987,756

(22) Filed: Nov. 11, 2004

(65) Prior Publication Data

US 2005/0181242 A1    Aug. 18, 2005

(30) Foreign Application Priority Data

Nov. 14, 2003 (JP) ............................ P2003-385288
Nov. 14, 2003 (JP) ............................ P2003-385290
Oct. 29, 2004 (JP) ............................ P2004-316988

(51) Int. Cl.
*H05K 5/00* (2006.01)

(52) U.S. Cl. ..................................... 361/679

(58) Field of Classification Search ............... 429/180; 361/679
See application file for complete search history.

(56) References Cited

U.S. PATENT DOCUMENTS 6,492,058 B1 * 12/2002 Watanabe et al. ........... 429/121
6,524,732 B1 * 2/2003 Iwaizono et al. ............... 429/7
6,696,197 B2 * 2/2004 Inagaki et al. ............... 429/120
6,803,144 B2 * 10/2004 Hovi et al. .................. 429/123
2004/0091769 A1 * 5/2004 Kawabata et al. .......... 429/163
2005/0064286 A1 * 3/2005 Kozu et al. ................. 429/180

FOREIGN PATENT DOCUMENTS

| JP | 04033260 | 2/1992 |
|---|---|---|
| JP | 2001325927 | 11/2001 |
| JP | 2003132859 | 5/2003 |
| JP | 2003162987 | 6/2003 |
| JP | 2003282039 | 10/2003 |
| JP | 2002-260608 | 9/2004 |

* cited by examiner

*Primary Examiner*—Yean-Hsi Chang
(74) *Attorney, Agent, or Firm*—Bell, Boyd & Lloyd LLP

(57) ABSTRACT

A battery pack and method of manufacturing same are provided. The battery pack can stabilize bending of a lead housed in a space defined by an external package. Leads 2, 3 of a battery element are bonded to a circuit board housed in a top cover 6. A holder 11 is mechanically fitted to the top cover 6, made of resin molded material and produced by injection molding, for example. The edge faces of ribs 12a, 12b, 12c formed on the holder 11 serve as planes which receive the circuit board 4 in the top cover 6. The top cover 6 and the holder 11 fitted to each other are turned 90°, and moved toward the opening in the edge face of the cell 1 while bending the leads 2, 3, which are bent along the contours of both the sidewalls and bottom surface of the holder 11 and housed in a space defined by the external package. The circumferential surface of the top cover 6 is bonded by heat to the inner surface of the external package.

14 Claims, 11 Drawing Sheets

BATTERY PACK AND METHOD FOR MANUFACTURING THE SAME

CROSS REFERENCE TO RELATED APPLICATIONS

The present document claims priority to Japanese Patent Document Application Nos. JP2003-385288 and JP2003-385290, both filed on Nov. 14, 2003, and Japanese Patent Document No. JP2004-316988 filed on Oct. 29, 2004, the entire contents of which are incorporated herein by reference.

BACKGROUND OF THE INVENTION

The present invention relates to a battery pack used in, a lithium ion polymer secondary battery, for example, and a method of manufacturing such battery pack.

In recent years, portable electronic apparatuses, such as laptop personal computers, portable phones, and PDAs (personal digital assistant), have been widely introduced to the market, and, as a power source for such apparatuses, a lithium ion battery has been widely used having advantages, such as provision of high voltage, high energy density, and being lightweight.

Further, lithium ion polymer secondary batteries have been put into practical use in order to solve the problem of leakage of liquid, which may occur when using an electrolyte in a liquid state. Examples of such batteries are lithium ion polymer secondary batteries using, as an electrolyte, a gelatinized polymer film comprising a polymer impregnated with a non-aqueous electrolytic solution, or an electrolyte in a solid state.

The polymer lithium ion battery has a construction of a cell including a battery element which has a positive electrode, a negative electrode, and a polymer electrolyte, wherein the positive electrode and the negative electrode are respectively electrically connected to leads, and which is covered with a packaging film, e.g., an aluminum laminate. Further, the cell and a wiring board having a circuit portion mounted thereon are together housed in a box-form plastic molded case comprising upper and lower cases.

For example, Japanese Laid-Open Patent Application No. 2002-260608 has a description of an example of the lithium ion polymer secondary battery having the above construction.

Conventionally, leads, which are connected to the positive electrode and the negative electrode of a battery element, have been bonded to a circuit board by resistance welding and housed in a plastic molded case, together with the battery element.

In the present specification, a strip-like positive electrode, a strip-like negative electrode, and a polymer electrolyte and/or a separator disposed between the positive and negative electrodes, which are stacked on one another and spirally wound together in a longitudinal direction, wherein the positive electrode and the negative electrode are respectively electrically connected to lead terminals, is referred to as "battery element". A battery element that is covered with an outer covering (package) is referred to as "cell". The cell that further has a circuit board having mounted thereon a circuit, such as a protective circuit, is referred to as "battery pack".

The conventional construction of the battery using a box-form molded case has a drawback in that the thickness is increased. The conventional cell has been improved in order to solve the existing problems and studies have been made on a cell covered with neither upper nor lower molded cases in a thicknesswise direction of the cell, or a cell using a thin metal plate as package. In these cells, a resin mold is inserted into the cover from both the edge faces of the cell. With respect to the conventional battery pack, the constituent parts of the battery pack are assembled after the cell is finished. In addition, the assembly lines for the cell and the battery pack are separated from each other.

FIG. 15 shows a view for explaining how a circuit board is fitted in the conventional battery pack. In the battery pack having a conventional construction, the circuit board has been housed in a container space defined by a packaging film while bending leads connected respectively to the positive electrode and the negative electrode of the battery element.

In FIG. 15, reference numeral 21 designates a circuit board. The circuit board 21 has mounted thereon a protective circuit having a protective element, such as a PTC, a fuse, or a thermistor, or the like. In addition, a lead 22 of the battery element is bonded to the circuit board 21 by resistance welding. The circuit board 21 is turned 90° in a clockwise direction and disposed in an opening in the edge face on the top side of an package 23 for containing the cell, and then placed in an exclusive die and subjected to resin mold integral molding.

However, in the conventional battery pack having the above construction, leads are bent by means of a jig or by hand and incorporated into the packaging film, and therefore a problem arises in that the bent form of the leads is not made stable. In addition, a die for integral molding and an exclusive injection molding machine for integral molding are needed, and further a problem occurs in that the temperature elevation caused during the resin molding adversely affects the IC parts or soldering portions on the circuit board.

With respect to the conventional battery pack, the constituent parts of the battery pack are assembled after the cell is finished. In addition, the assembly lines for the cell and the battery pack are separated from each other. Therefore, there has been a problem in that the production process for the battery pack is complicated. On the other hand, a method in which the cell is finished and then the cell and a resin mold portion are subjected to integral molding is known, but this method has problems in that the temperature elevation caused during the resin molding adversely affects the IC parts or soldering portions on the circuit board, and that the dimensional accuracy of the battery pack is poor.

SUMMARY OF THE INVENTION

The present invention relates to a battery pack used in, a lithium ion polymer secondary battery, for example, and a method of manufacturing such battery pack.

The present invention in an embodiment provides a battery pack and a method of manufacturing a battery pack, which are advantageous not only in that bending of the leads can be made stable, but also in that no integral molding is required and hence an adverse effect of the temperature elevation during the molding is avoided.

Further, another embodiment of the present invention is to provide a method of manufacturing a battery pack, which is advantageous not only in that the production process for the battery pack can be simplified, but also in that the method requires no integral molding and hence is free of problems caused by the integral molding.

Further, by inserting a compact hot melt molding machine that can be disposed in a cell-type manufacture line, it is possible to provide a battery pack and a battery pack manufacturing method in which the manufacture line can be simplified and degradation of mechanical strength can be prevented.

Still, further, by using a hot melt (polyamide resin) that can be molded at low temperature by resin forming, an adverse effect on the circuit board due to temperature during the molding can be avoided.

In a preferred embodiment, a battery pack has a battery element for secondary battery, an external package for housing the battery element and having a first and a second opening at both ends; a first and a second cover, made by resin molding, fitted to the first and the openings, respectively; and a circuit board joined to a lead of the battery element housed in the first cover fitted to the first opening.

In another embodiment, a method of manufacturing a battery pack having a battery element for secondary battery is provided. The method includes board joining process of joining a circuit board to a lead of the battery element housed in an external package having a first and a second openings at both ends; top cover assembling process of covering the circuit board with a top cover made by resin molding in a perpendicular direction in relation to a planar surface of the circuit board; cover engaging process of engaging the top cover with a holder while supporting the circuit board by the holder from an open side of the top cover; cover assembling process of inserting the top cover and the holder through the first opening into an inner space of the external package by turning the top cover and the holder engaged together substantially by 90° while bending the lead; back cover assembling process of inserting a back cover into the inner space of the external package through the second opening; and joining process of joining the top cover and the back cover to the external package.

In yet another embodiment, a method of manufacturing a battery pack having a battery element for a secondary battery is provided. The method includes board joining process of joining a circuit board to a lead of the battery element housed in an external hard package having a first and a second openings at both ends; top cover assembling process of covering the circuit board with a top cover made by resin molding in a perpendicular direction in relation to a planar surface of the circuit board; cover engaging process of engaging the top cover with a holder while supporting the circuit board by the holder from an open side of the top cover; cover assembling process of inserting the top cover and the holder through the first opening into an inner space of the external package by turning the top cover and the holder engaged together substantially by 90° while bending the lead; back cover assembling process of inserting a back cover into the inner space of the external package through the second opening; first joining process of joining the top cover to the external package; and second joining process of joining the top cover to the external package by using adhesive or hot melt.

In still yet another embodiment, a method of manufacturing a battery pack having a battery element for a secondary battery is provided. The method includes board joining process of joining a circuit board to a lead of the battery element housed in an external hard package having a first and a second openings at both ends; top cover assembling process of covering the circuit board with a top cover made by resin molding in a perpendicular direction in relation to a planar surface of the circuit board; cover engaging process of engaging the top cover with a holder while supporting the circuit board by the holder from an open side of the top cover; cover assembling process of inserting the top cover and the holder through the first opening into an inner space of the external package by turning the top cover and the holder engaged together substantially by 90° while bending the lead; back cover assembling process of inserting a back cover into the inner space of the external package through the second opening; joining process of joining the top cover to the external package; and inserting process of inserting a back cover formed by resin or hot melt from the second opening into an internal space of the external package.

In a further embodiment, a method of manufacturing a battery pack having a battery element for secondary battery is provided. The method includes housing process of housing the battery element into a laminate material; board joining process of joining a circuit board to a lead of the battery element; board assembling process of assembling the circuit board in a first cover; cover mounting process of mounting on the laminate material in an open state, the first cover having the circuit board assembled therein and a second cover disposed on another end of the battery element; and joining process of surrounding the first and second covers and the battery element by the laminate material and joining end portions of the laminate material together, as well as the inner surface of the laminate material to the circumferential surfaces of the first and second covers.

According to an embodiment, the resin mold cover to be fitted to a circuit board is a molded article separately produced in a different step, and therefore the circuit board is not affected by heat, which is caused when the resin mold portion and the cell are together subjected to integral molding, thus improving reliability. In addition, the resin mold cover can be improved in dimensional accuracy. Further, the production line for the cell and the production line for the battery pack can be united, thus improving production efficiency.

According to an embodiment, the resin mold cover and the packaging can be securely joined together, so that the edge of the packaging can be prevented from being stripped. Further, they can be jointed together by heat bonding, heat pressing through a heat bonding sheet, bonding using an adhesive, or the like and hence only inexpensive equipment is required for the joint, so that the production cost for the battery pack can be reduced.

According to an embodiment, the constituent parts of the battery pack are assembled in a state in which the laminate material is opened, making it possible to facilitate assembling of the constituent parts of the battery pack.

In an embodiment, the laminate material is bent according to the form of the resin mold cover, so that the bent form of the laminate material can be made stable.

In an embodiment, the parts are assembled while holding the resin holder, and therefore the circuit board can be prevented from being directly touched by hand.

In an embodiment, the leads can be stably bent without using jigs.

In an embodiment, the degradation of mechanical strength is avoided by introducing a compact hot melt molding that can be disposed into a cell-type manufacturing line.

In an embodiment, an adverse effect on the circuit board due to temperature is avoided by using a hot melt that can be molded at low temperature.

Additional features and advantages of the present invention are described in, and will be apparent from, the following Detailed Description of the Invention and the figures.

DETAILED DESCRIPTION OF THE INVENTION

The present invention relates to a battery pack used in, a lithium ion polymer secondary battery, for example, and a method of manufacturing such battery pack.

Figure 1:
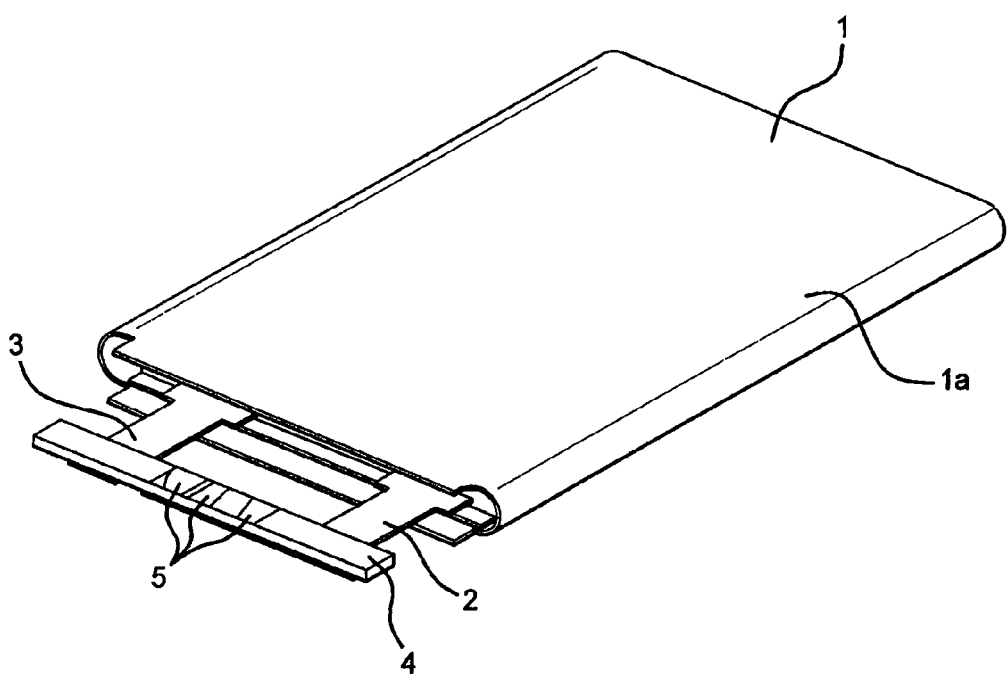
FIG. 1 shows a perspective view of a state in which a circuit board is fitted to a lead of a cell, according to a preferred embodiment of the present invention.

Hereinbelow, a preferred embodiment of the present invention will be described with reference to the drawings according to the assembling order. In FIG. 1, reference numeral 1 designates a cell for a battery made of lithium ion polymer secondary battery, for example. The cell 1 as an example comprises a battery element covered with a hard laminate material 1a as a package.

The battery element includes a strip-like positive electrode, a strip-like negative electrode, and a polymer electrolyte and/or a separator disposed between the positive and negative electrodes, which are stacked on one another and spirally wound together in the longitudinal direction, wherein the positive electrode and the negative electrode are electrically connected to lead terminals 2 and 3, respectively.

The positive electrode includes a cathode active material layer formed on a strip-like cathode current collector, and further a polymer electrolyte layer formed on the cathode active material layer. The negative electrode comprises an anode active material layer formed on a strip-like anode current collector, and further a polymer electrolyte layer formed on the anode active material layer. The lead terminals 2 and 3 are joined to the cathode current collector and the anode current collector, respectively. As the cathode active material, the anode active material, and the polymer electrolyte, the materials already proposed can be used.

In the positive electrode, as the cathode active material, a metal oxide, a metal sulfide, or a specific polymer can be used according to the type of the desired battery. For example, when a lithium ion battery is constructed, as the cathode active material, a lithium-containing composite oxide comprised mainly of $Li_xMO_2$ can be used wherein M represents at least one transition metal, and x generally represents 0.05 to 1.10, which varies depending on the charged state or discharged state of the battery. As the transition metal M constituting the lithium-containing composite oxide, Co, Ni, or Mn is preferred.

Specific examples of the lithium ion-containing composite oxides include $LiCoO_2$, $LiNiO_2$, $LiNi_yCo_{1-y}O_2$ wherein $0<y<1$, and $LiMn_2O_4$. These lithium-containing composite oxides can exhibit high voltage and excellent energy density. Alternatively, as the cathode active material, a metal sulfide or oxide having no lithium, such as $TiS_2$, $MoS_2$, $NbSe_2$, or $V_2O_5$, may be used. In the positive electrode, a plurality of these cathode active materials may be used in combination. Further, when the positive electrode is formed using the above-mentioned cathode active material, an electrical conductor, a binder, or the like may be added.

As a material for the negative electrode, a material capable of being doped with lithium and dedoped can be used. For example, a carbonaceous material, such as a non-graphitizable carbon material or a graphite material, can be used. More specifically, a carbonaceous material, such as pyrolytic carbon, coke (e.g., pitch coke, needle coke, petroleum coke), graphite, glassy carbon, a calcined product of an organic polymer compound (e.g., obtained by carbonization of a phenolic resin, a furan resin, or the like by calcining it at an appropriate temperature), carbon fiber, or activated carbon, can be used. Further, as the material capable of being doped with lithium and dedoped, a polymer, such as polyacetylene or polypyrrole, or an oxide, such as $SnO_2$, can be used. When the negative electrode is formed from the above material, a binder or the like may be added.

The polymer electrolyte includes a polymer having incorporated thereinto a gelatinized electrolyte obtained by mixing together a polymer material, an electrolytic solution, and an electrolyte salt. The polymer material has such a property that it is compatible with the electrolytic solution, and, as a silicone gel, an acrylic gel, an acrylonitrile gel, a polyphosphazene modified polymer, polyethylene oxide, polypropylene oxide, or a composite polymer, crosslinked polymer, or modified polymer thereof, or a fluorine polymer, a polymer material, such as poly(vinylidene fluoride), poly(vinylidene fluoride-co-tetrafluorosafluoropropylene), or poly(vinylidene fluoride-co-trifluoroethylene), or a mixture thereof is used.

The electrolytic solution component is dispersible therein the above-mentioned polymer material, and, as an aprotic solvent, for example, ethylene carbonate (EC), propylene carbonate (PC), butylene carbonate (BC), or the like is used.

As the electrolyte salt, one which is compatible with the solvent is used, and the electrolyte salt is comprised of a combination of a cation and an anion. As the cation, an alkali metal or an alkaline earth metal is used. As the anion, $Cl^-$, $Br^-$, $I^-$, $SCN^-$, $ClO_4^-$, $BF_4^-$, $PF_6^-$, $CF_3SO_3^-$, or the like is used. As the electrolyte salt, specifically, lithium hexafluorophosphate or lithium tetrafluoroborate is used in such a concentration that it can be dissolved in the electrolytic solution.

The hard laminate material has a construction in which it is stacked on an inner soft laminate material 24a, for example. The reason why the soft laminate material is used resides in that a concave portion for containing the battery element therein is formed by drawing. As an example, the inner soft laminate material includes, from the inner side (the side in contact with the hard laminate material), a polypropylene (PP) layer as a bonding layer, a soft aluminum metal layer, and a polypropylene (PP) layer which are stacked on one another.

The polypropylene layer achieves heat bonding and prevents the polymer electrolyte from changing in the properties. As the polypropylene layer, casted polypropylene (CPP) or the like is used. For example, a polypropylene (PP) layer having a thickness of about 30 µm is formed. The polypropylene (PP) layer has a melting temperature of which heat applied to the cell during the heat bonding does not adversely affect the cell.

The soft aluminum metal layer prevents moisture from entering the battery element. As the soft aluminum metal layer 16A, annealed aluminum (3003-O JIS H 4160) or (3004-O JIS H 4160) or the like having a thickness in the range of about 30 µm to about 130 µm is used.

The hard laminate material appearing on the outer surface is such hard that it can maintain its form when it is bent and it is resistant to deformation due to an external force. The hard laminate material has a polypropylene layer as a bonding layer, a hard aluminum metal layer, and a nylon layer or PET layer as a surface protective layer. The nylon layer or PET layer protects the surface. The nylon layer or PET layer has a thickness of about 10 µm to about 30 µm.

The leads 2 and 3 connected respectively to the positive electrode and the negative electrode are introduced from one edge face (on the top side) of the cell 1. A circuit board 4 is bonded to the leads 2 and 3 by resistance welding, ultrasonic welding, or the like. The circuit board 4 has mounted thereon a protective circuit including a temperature protective element, such as a fuse, a PTC, or a thermistor, an ID resistance for identifying the battery pack, and the like. On the circuit board 4 are formed a plurality of, e.g., three contact portions 5. In the above mentioned protective circuit, a protective circuit is also applied including an IC which performs monitoring of the secondary battery and controls FET (Field Effect Transistor), as well as a charging/discharging controlling FET.

The PTC is connected to the battery element in series, and rapidly increases in electrical resistance to substantially cut the current in the battery when the temperature of the battery is higher than a predetermined temperature. The fuse or thermistor is also connected to the battery element in series, and cuts the current in the battery when the temperature of the battery is higher than a predetermined temperature. In addition, since if the terminal voltage of the secondary battery exceeds 4.3 to 4.4V/secondary battery, there is danger of heat generation and fire, the protective circuit that includes an IC that monitors the secondary battery and controls the FET, as well as the charge/discharge of the FET, prevents charging by turning the charging controlling FET off if exceeding the 4.3 to 4.4V/secondary battery. The terminal voltage of the secondary battery is over discharged down to a discharge-prohibiting voltage, and, when the voltage of the secondary battery turns to 0V, the secondary battery turns internally to a short circuit, so that it becomes impossible to recharge it again. Accordingly, discharge is prevented by monitoring the voltage of the secondary battery and turning off the discharge controlling FET which has a voltage lower than the discharge-prohibiting voltage.

Figure 2:
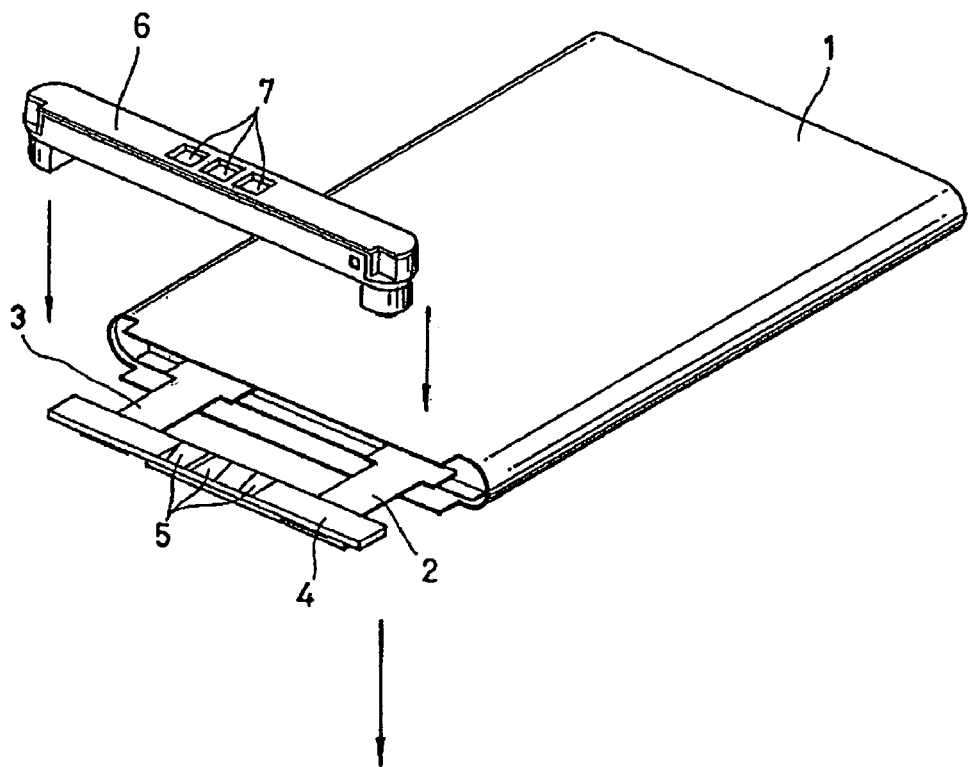
FIG. 2 shows perspective views for explaining how a top cover is fitted, according to a preferred embodiment of the present invention.
Figure 2:
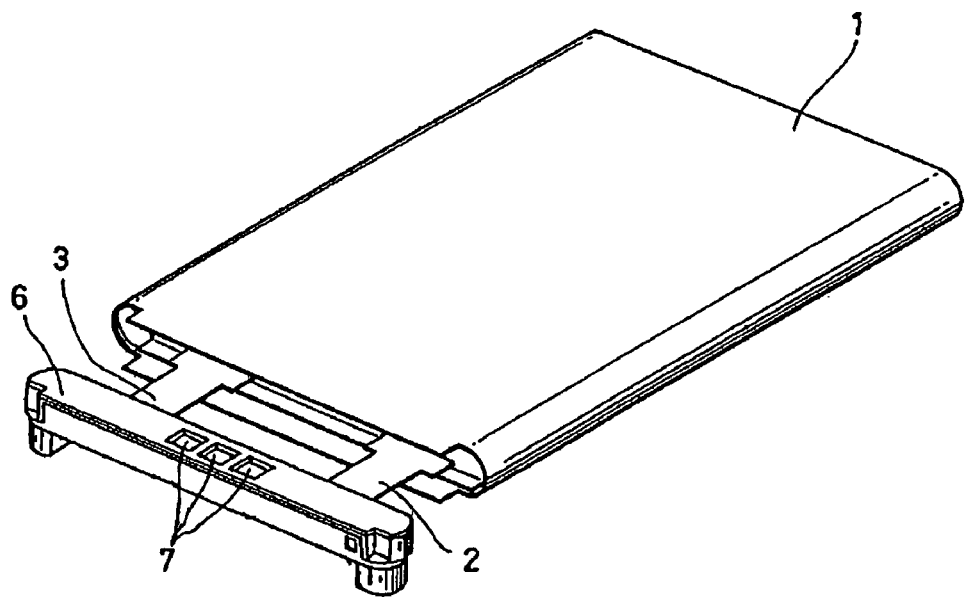

In FIG. 2, reference numeral 6 designates a top cover made of a resin molded article separately produced in a different step by injection molding or the like. The top cover 6 is fitted to the circuit board 4 so as to cover the circuit board 4. Inside the top cover 6 is provided a retainer portion for keeping the circuit board 4 horizontal. Further, three openings 7 are formed in the top surface of the top cover 6 at positions corresponding to the contact portions 5. The contact portions 5 are exposed through the openings 7. The width of the top cover 6 is selected so as to be slightly smaller than the inner dimension of the height of the opening in the edge face on the top side of the cell 1.

Figure 3:
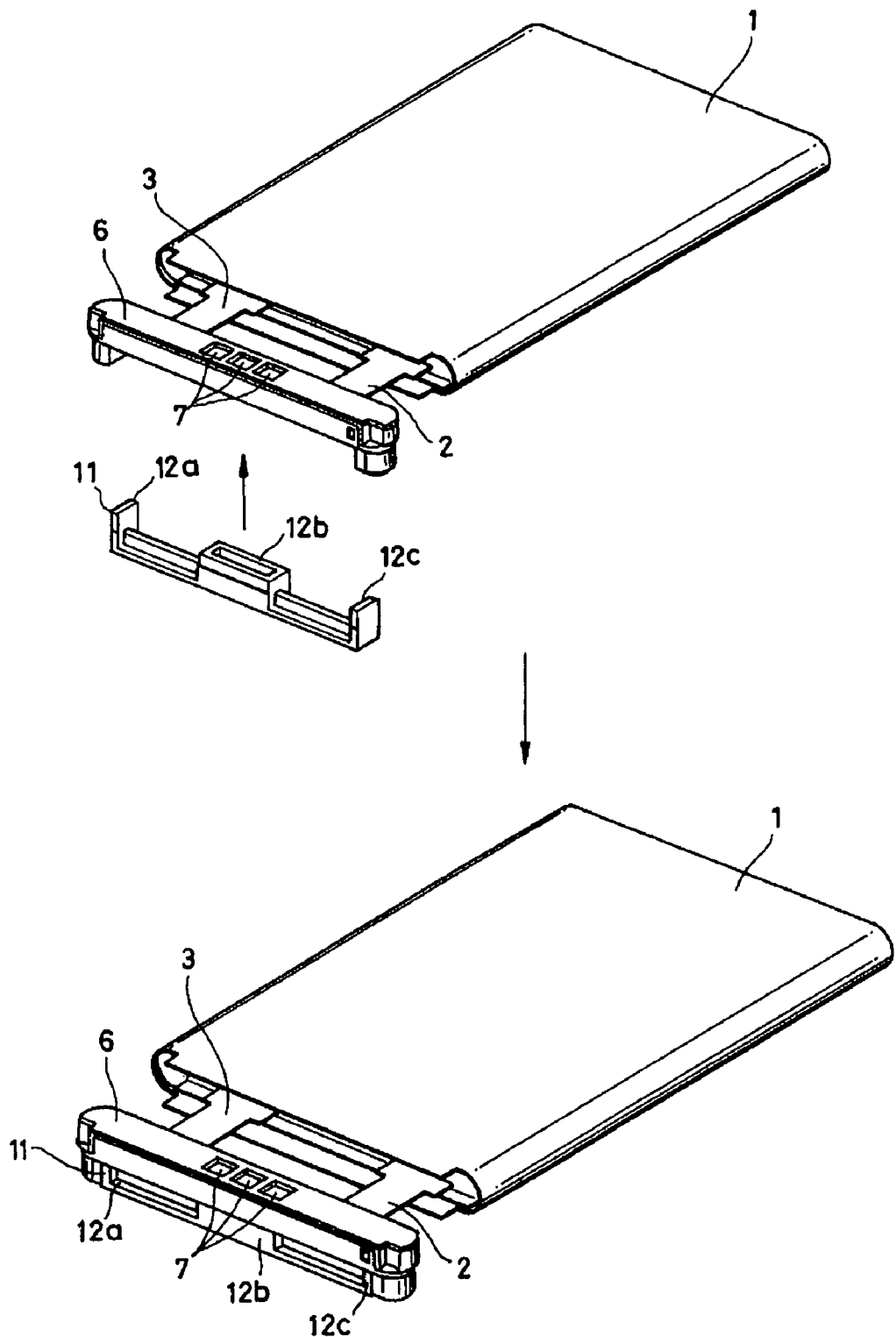
FIG. 3 shows perspective views for explaining how a holder is fitted, according to a preferred embodiment of the present invention.

Next, as shown in FIG. 3, a holder 11 is fitted to the top cover 6. The holder 11 is made of a resin molded article separately produced in a different step by injection molding or the like. Ribs 12a, 12b, 12c protruding toward the top cover 6 are respectively formed at both the ends and middle portion of the holder 11. The edge faces of the ribs 12a, 12b, and 12c serve as planes which receive the circuit board 4 in the top cover 6, so that the circuit board 4 is surely supported.

Figure 4:
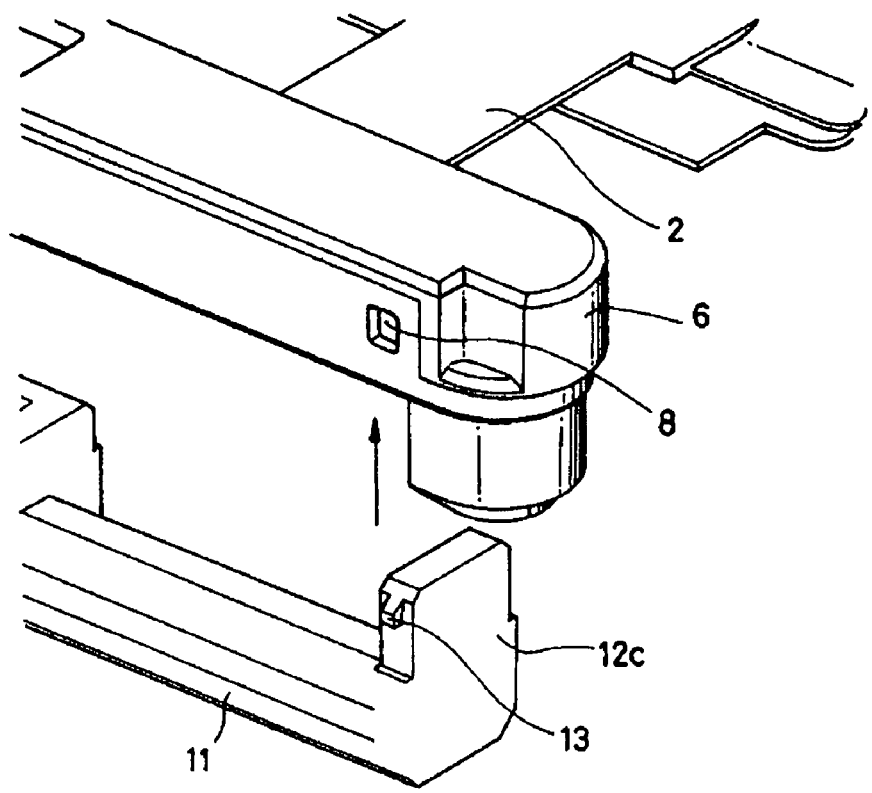
FIG. 4 shows perspective views of a detailed portion of the top cover and the holder fitted to each other, according to a preferred embodiment of the present invention.
Figure 4:
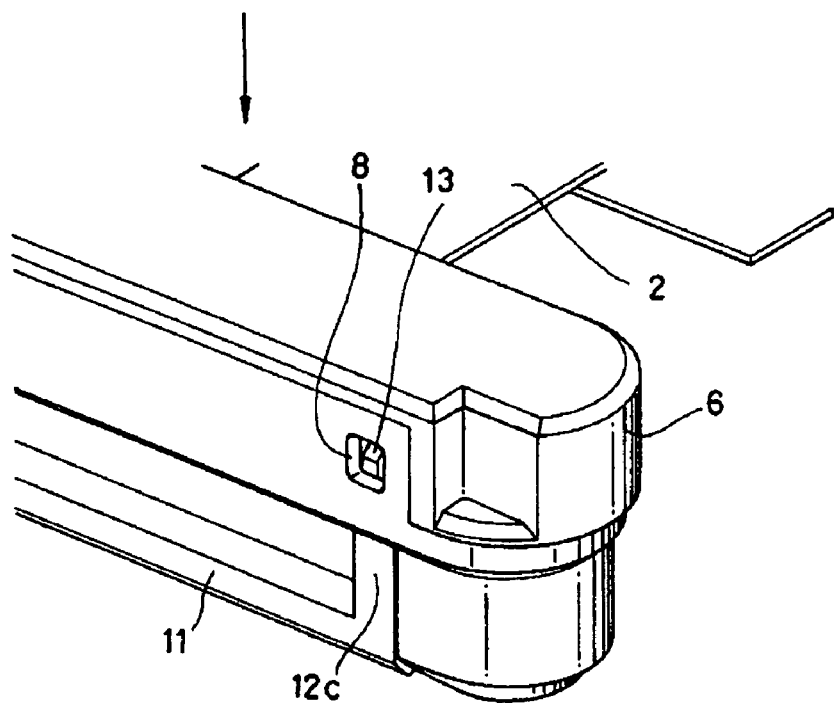

The holder 11 is fitted to the top cover 6 from the lower side. In this embodiment, as shown in the enlarged view of FIG. 4, they are fitted to each other by a mechanical engaging means. Specifically, a hole 8 for engagement is formed in the top cover 6, and a hook 13 formed at an edge portion of the rib 12c of the holder 11 is put in the hole 8, so that the top cover 6 and the holder 11 are fitted to each other. A not shown similar hook is formed at the rib 12a on another end of the holder 11, and the hook is put in a hole in the top cover 6, so that the top cover 6 and the holder 11 are fitted to each other.

Figure 5:
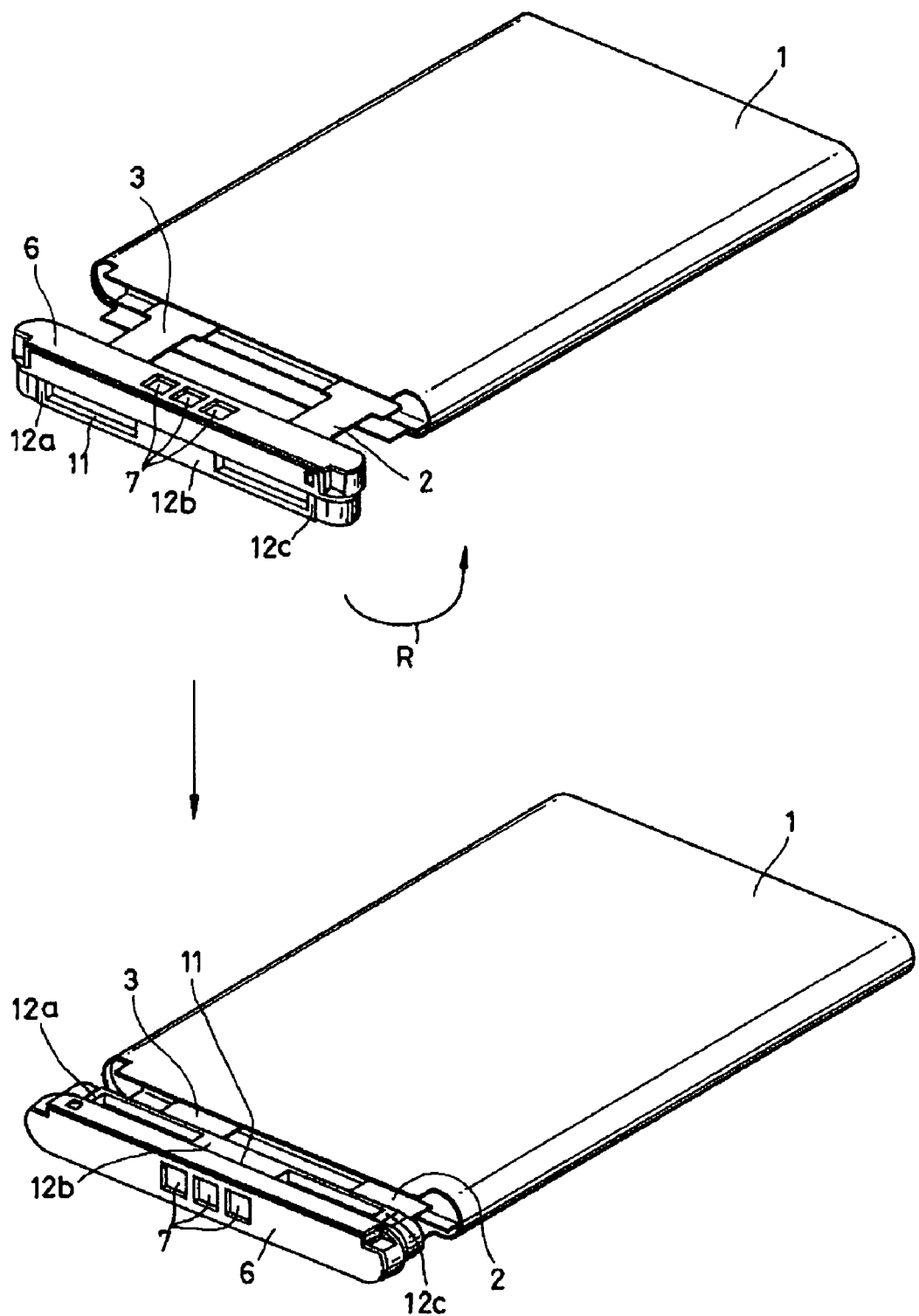
FIG. 5 shows perspective views for explaining how the leads are bent, according to a preferred embodiment of the present invention.

Then, the top cover 6 and the holder 11 fitted to each other are turned 90° in a clockwise direction indicated by an arrow R in FIG. 5 by hand or by means of a jig, so that the circuit board 4 positioned horizontally is changed to be vertical. In this case, the circuit board 4 is disposed between the top cover 6 and the holder 11 and hence is not exposed, and therefore the cover and holder can be turned without touching the circuit board 4.

Figure 6:
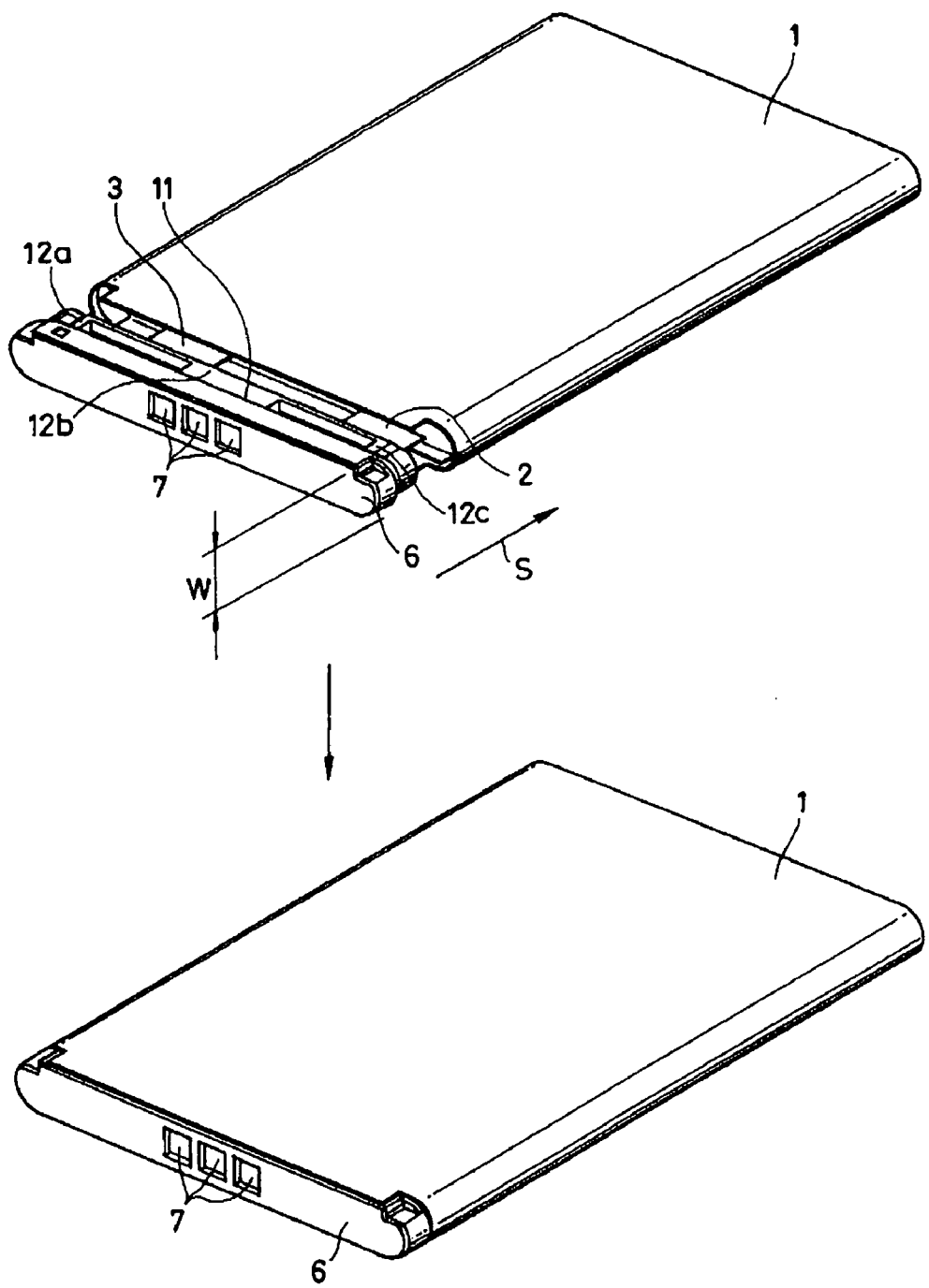
FIG. 6 shows perspective views for explaining the operation of inserting the top cover and holder into an opening in the edge face of the cell, according to a preferred embodiment of the present invention.

Next, as shown in FIG. 6, while bending the leads 2 and 3, the top cover 6 and the holder 11 are together moved toward the opening in the edge face of the cell 1 (in the direction indicated by an arrow S). As mentioned above, the width W of the top cover 6 is slightly smaller than the inner dimension of the opening, and hence the top cover 6 and the holder 11 having the circuit board 4 disposed therebetween can be housed in a space defined by the hard laminate material near the edge face of the cell 1.

Figure 7:
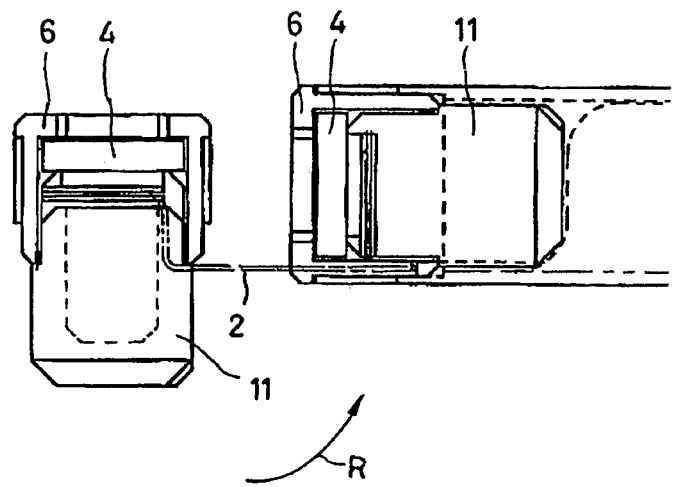
FIG. 7 shows cross-sectional views for explaining in detail how the leads are bent, according to a preferred embodiment of the present invention.
Figure 8:
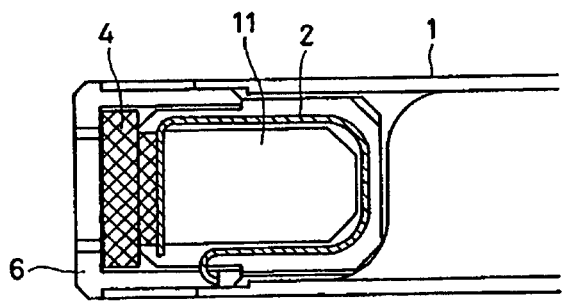
FIG. 8 shows cross-sectional view of a state in which the top cover and holder are inserted into an opening in the edge face of the cell, according to a preferred embodiment of the present invention.

FIG. 7 is a partially enlarged view of the top cover 6 and holder 11 which are turned together in the direction indicated by the arrow R as described above. FIG. 8 is a cross-sectional view showing a state in which the top cover 6 and holder 11 are housed in a container space defined by the hard laminate material for the cell 1. The top cover 6 is fitted to the opening in the edge face of the cell 1, and the circumferential surface of the top cover 6 and the inner surface of the hard laminate material are closely in contact with each other.

The leads 2, 3 are bent along the contours of both the sidewalls and bottom surface of the holder 11. Considering the welding of the leads to the circuit board and the length of the contour of the circumference of the holder 11, the length of each of the leads 2, 3 is selected so that the bent form of the leads can be stable. As shown in FIG. 8, the leads 2, 3 are positioned in the gap between the inside of the hard laminate material and both the sidewalls and bottom surface of the holder 11. Therefore, when bending the leads 2, 3, it is unnecessary to touch the leads 2, 3 by hand. Further, the leads 2, 3 are bent along the contour of the circumference of the holder 11 and hence the bent form of the leads is made stable, and further the bent form can be stable in a state in which the leads are housed in the cell 1.

Figure 9:
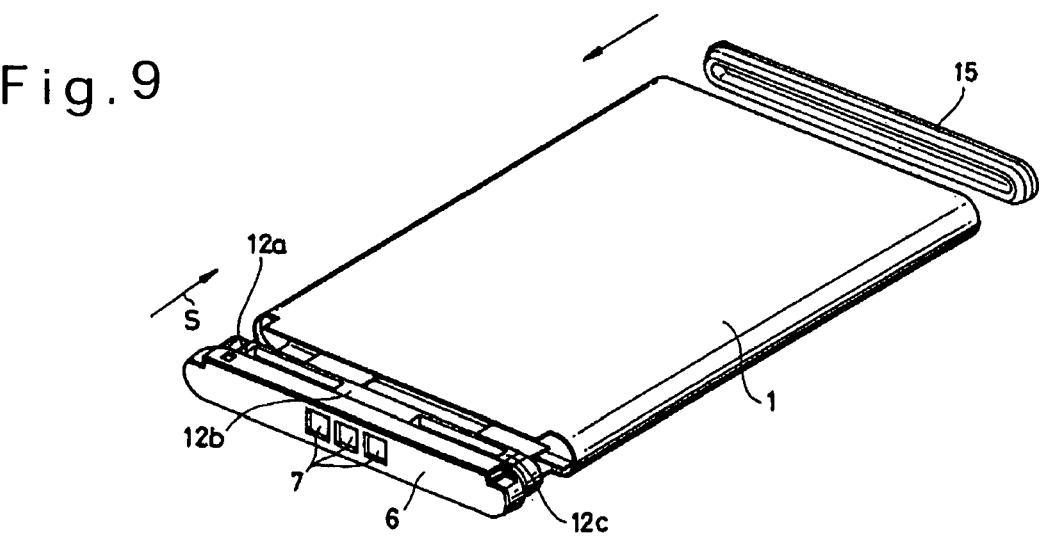
FIG. 9 shows a perspective view for explaining how a bottom cover is inserted, according to a preferred embodiment of the present invention.

Further, as shown in FIG. 9, a bottom cover 15 is inserted to an opening formed by the hard laminate material at the edge face on the bottom side of the cell 1. The bottom cover 15 closes the opening on the bottom side.

Figure 10:
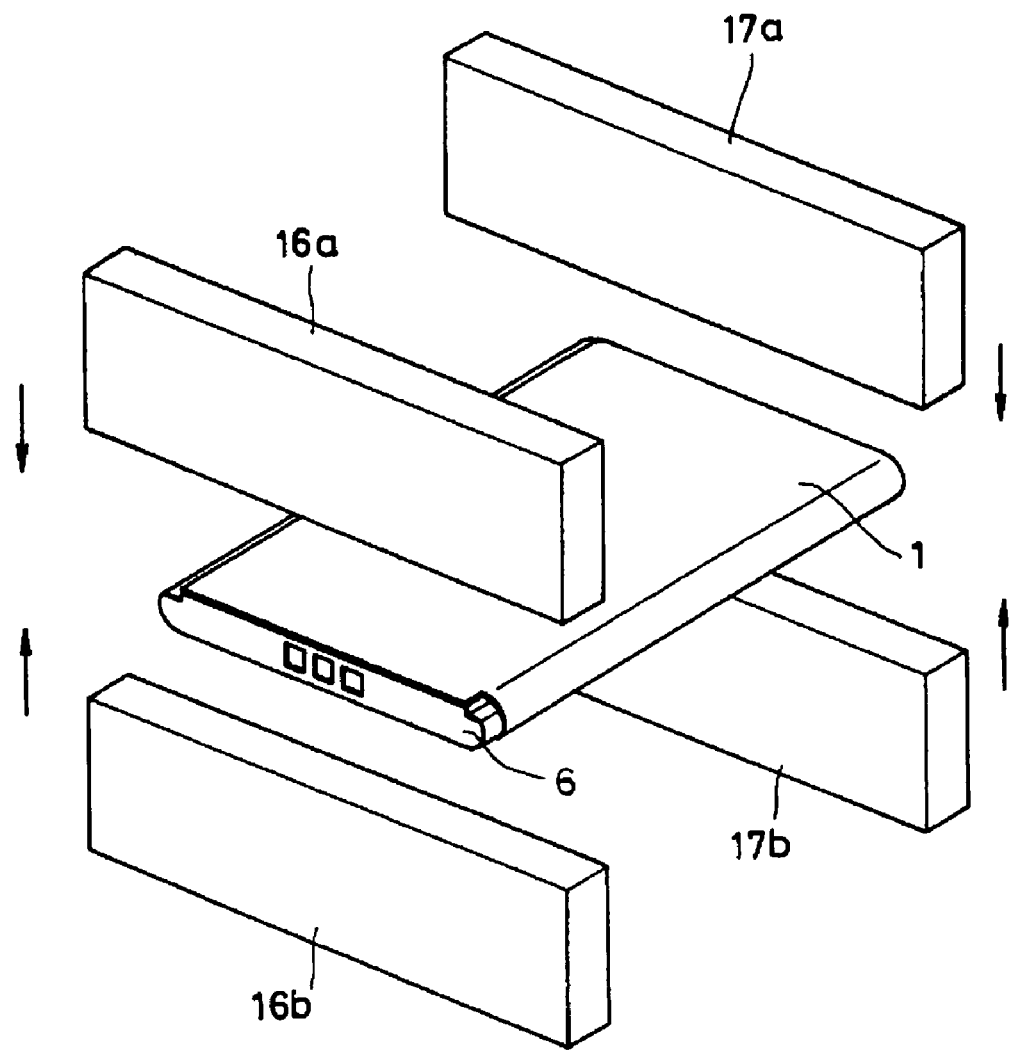
FIG. 10 shows a perspective view for explaining a heat bonding treatment, according to a preferred embodiment of the present invention.

Then, the entire length is pressed by a jig to achieve heat bonding as shown in FIG. 10. Specifically, a portion of the cell 1 near the end on the top side is sandwiched between heater blocks 16a and 16b made of a metal, such as copper, to bond by heat the circumferential surface of the top cover 6 to a polypropylene layer constituting the inner surface of the laminate material. Similarly, a portion of the cell 1 near the end on the bottom side is sandwiched between heater blocks 17a and 17b to bond by heat the circumferential surface of the bottom cover 15 to a polypropylene layer constituting the inner surface of the laminate material.

Another preferred embodiment of the present invention will be described below with reference to the drawings.

Figure 11:
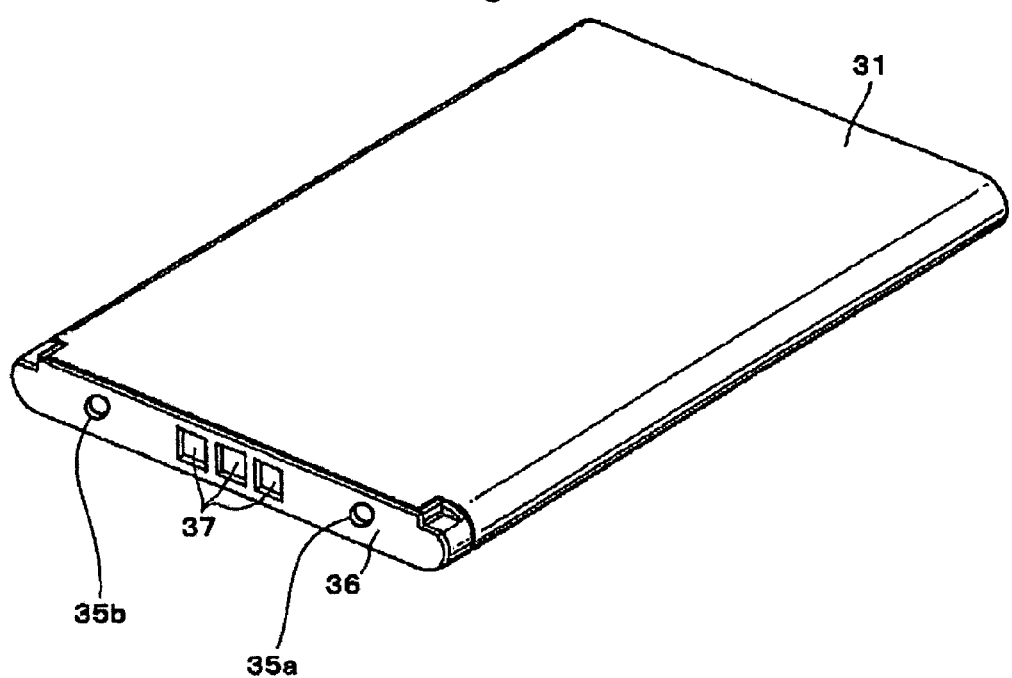
FIG. 11 shows a perspective view representing the top cover and the holder housed in the cell.

FIG. 11 is a perspective diagram representing top cover 36 and holder 11 accommodated in cell 1. The battery pack is manufactured by a process of pouring a hot melt by introducing into a mold, not shown, the set containing the top cover 36 and the holder 11 accommodated in the cell 31, as shown in FIG. 11. As shown in FIG. 11, two holes, for example, are provided in the top cover 36. Hole 35a is provided for hot melt-pouring. The other hole 35b is provided for gas exhausting during molding. The size of the holes is about 0.8 mm to about 1.5 mm, for example.

If hot melt is poured in, since the component space as shown in FIG. 8 is filled up with hot melt, the mechanical strength of the substrate support and the first cover is enhanced. Although not limited to this, a suitable hot melt used is a hot melt of a polyamide-group, for example.

A process until heat-adhesion shown in FIG. 10 is a process similar to the above-mentioned preferred embodiments, with exception to the introduction of bottom cover 15 against an opening that a hard lamination material forms in an end portion of the bottom side of cell 1, as shown in FIG. 9. Then, the full length is pressed by a jig and, the heat adhesion is carried out as described above, as shown in FIG. 10. In this event, heat-adhesion is not carried out at the bottom side in an embodiment.

In an embodiment, the bottom is joined without heat crimping. Although the bottom cover produced by resin molding is used, in order to close the opening at bottom the bottom side, this is formed by using hot melt poured in from the top cover side. Mechanical strength can be improved since no space is left between a cell element, by casting using hot melt.

Figure 12:
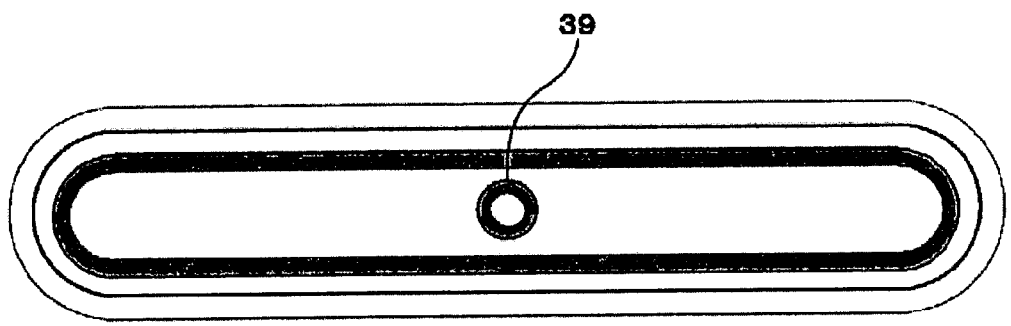
FIG. 12 shows a planar view of the bottom cover.

FIG. 12 is a plane view of the bottom cover used according to another preferred embodiment. A process until it results in the heat adhesion shown in FIG. 10 is the similar as the preferred embodiments mentioned above, as shown in FIG. 9. This uses a bottom cover manufactured by resin molding, as in conventional processes. As shown in FIG. 12, a hole 39 for resin pouring is provided in this bottom cover. This hole 39 has about 0.8 mm to about 1.5 mm, for example. The junction is obtained by pouring in resin (hot melt) from this hole 39 and thus making the space therein filled up with resin. The mechanical strength of the battery pack is improved as the space formed between the cell portion and the bottom cover is filled in by the injected resin. In addition, the hole for introduction of resin is not limited to one place.

Figure 13:
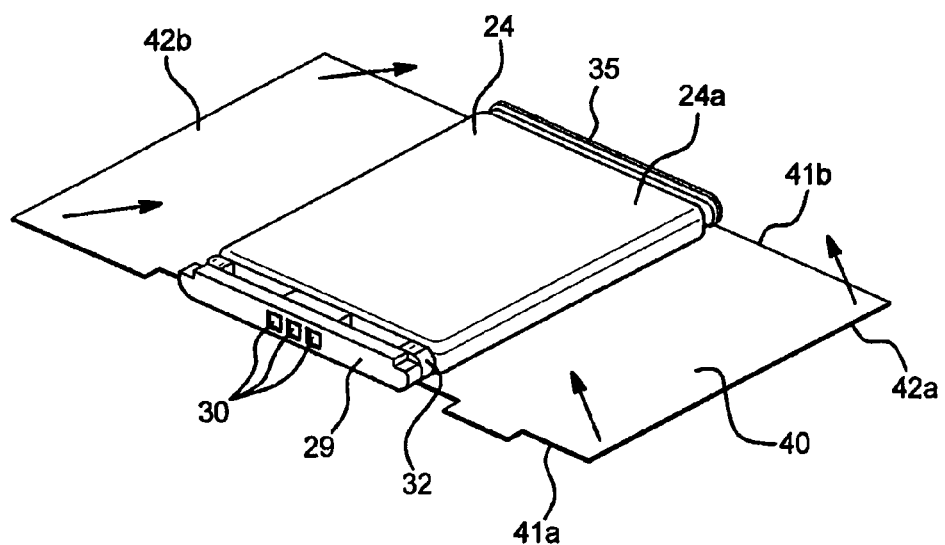
FIG. 13 shows a perspective view of a state in which a cover is disposed on a packaging laminate film in the opened state, according to a preferred embodiment of the present invention.
Figure 14:
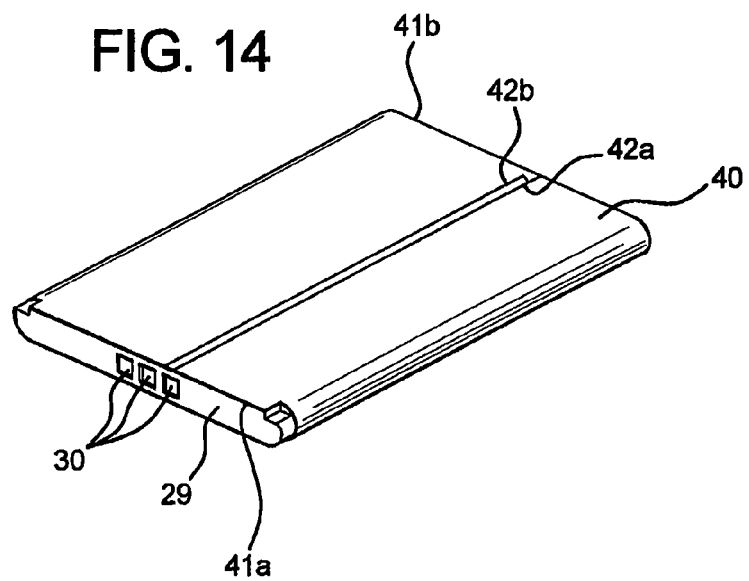
FIG. 14 shows a perspective view showing a state in which the packaging laminate film is folded and closed, according to a preferred embodiment of the present invention.
Figure 15:
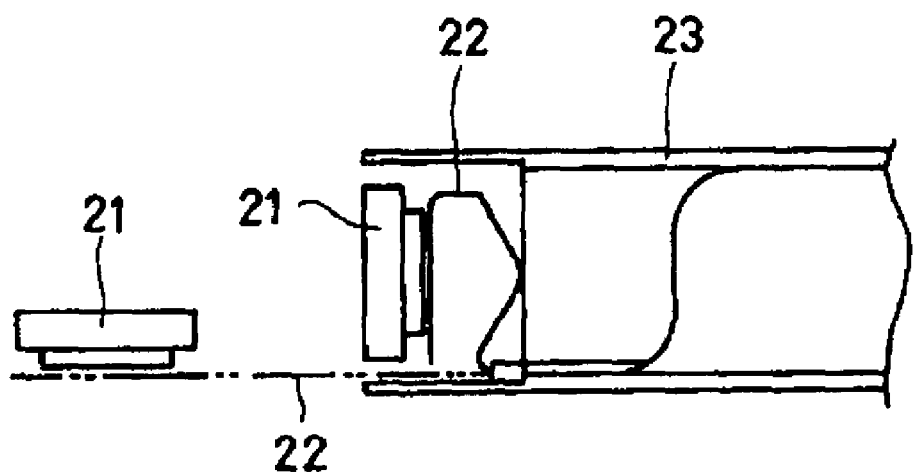
FIG. 15 shows a cross-sectional view for explaining a conventional battery pack.

Another preferred embodiment will be described with reference to the drawings. In FIG. 13, reference numeral 24 designates a cell for a battery, for example, lithium ion polymer secondary battery. As an example, the cell 24 is thin and rectangular, and includes a battery element covered with a relatively soft, inner laminate film material. Specifically, a concave portion for containing the battery element therein is formed in the inner laminate film by drawing, and the battery element is inserted into the concave portion, and then electrode leads are electrically connected to the battery element, and the periphery of the opening of the concave portion is sealed by heat bonding or the like, thus producing the cell 24.

The cell 24 is covered with and wound by a hard packaging laminate film 40. The packaging laminate film 40 is wound round the cell 24 so that the edge face of the cell 24 on the side from which the leads are introduced (referred to as "top side") and the edge face on the opposite side (referred to as "bottom side") are exposed. As shown in FIG. 12, a cover on the top side and a cover on the bottom side are assembled before covering the packaging laminate film 40 round the cell, and then the packaging laminate film 40 is folded. The packaging laminate film 40 has sides 41a and 41b defining the openings in both the edge faces, and sides 42a and 42b perpendicular to these sides.

The cover on the top side includes, as described above, a top cover 29 and a holder 32 which are fitted to each other. The top-side cover and a bottom cover 35 are separately produced in different steps by resin molding.

Moreover, a bottom side can be formed using hot melt, as mentioned above. Furthermore, the bottom side can be joined by using a bottom cover provided with the resin introduction hole 39, manufactured by resin fabrication in another process, and filling in hot melt through the hole, thus filling up the space with resin.

The top-side cover 29, 32 and the bottom cover 35 are arranged and then, while keeping the positions of them by means of a jig, the packaging laminate film 40 is folded so that the sides 42a and 42b are either in contact with each other or face each other but separated by a slight gap. The folded packaging laminate film 40 is bonded by heat to the inner laminate film.

Subsequent to the heat bonding for the packaging laminate film 40, the inner surface of the end region along the side 41a is bonded by heat to the circumferential surface of the top cover 29, and the inner surface of the end region along the side 41b is bonded by heat to the circumferential surface of the bottom cover 35. FIG. 13 shows the thus finished battery pack. For achieving the heat bonding, the surface of the inner laminate film and the surface of the packaging laminate film which face each other are individually made of a bonding layer which can be bonded by heat. The bonding layer and the circumferential surface of a cover produced by a resin mold can be bonded together by heat.

As described above, the battery element includes a strip-like positive electrode, a strip-like negative electrode, and a polymer electrolyte and/or a separator disposed between the positive and negative electrodes, which are stacked on one another and spirally wound together in a longitudinal direction, wherein the positive electrode and the negative electrode are respectively electrically connected to lead terminals. The materials for the positive electrode and the negative electrode, the polymer electrolyte, the electrolytic solution ingredients, the package, the cover on the top side, and the PTC are similar to those as discussed above.

The present invention should not be construed as to be limited to the preferred embodiments presented herein above, so that various modifications, variations, combinations, sub-combinations as well as different applications thereof are possible for the present invention without departing from the scope of this invention. For example, heat adhesion may be obtained by adhesive methods other than the heat adhesion method of joining a resin mold cover with an external covering member as described above, but by crimping, by sandwiching heat adhering sheets, adhesives, hot melt, and the like. Moreover, joining may be obtained by ultrasonic welding, a structure of cells and snap in structures and the like.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A battery pack comprising:
    a battery element for a secondary battery;
    a hard laminate material package for housing the battery element having a first and a second opening and having a construction in which a hard laminate material is stacked on an inner soft laminate material wherein the inner soft laminate material includes, from an inner side in contact with the hard laminate material, a bonding layer, a soft aluminum metal layer, and a resin layer in a stacked arrangement;
    a first and a second cover, made by resin molding, fitted to the first and the second openings, respectively; and
    a circuit board joined to a lead of the battery element housed in the first cover fitted to the first opening.

2. The battery pack according to claim 1, wherein the first cover comprises a top cover and a holder engaged together by any one of a mechanical engaging means and bonding; wherein
    the circuit board is inserted to the top cover from an open side of the top cover; and
    the holder is engaged with the top cover from the open side of the top cover and the circuit board is supported by a supporting surface of the holder.

3. The battery pack according to claim 2, wherein the top cover and the holder engaged together are turned substantially 90° and inserted into an inner space of the hard laminate material package through the first opening while bending the lead.

4. The battery pack according to claim 3, wherein the lead is bent within the hard laminate material package along a contour of a circumference of the holder inserted into the hard laminate material package.

5. The battery pack according to claim 3, wherein a circumferential surface of the top cover inserted into the hard laminate material package is joined to the inner surface of the hard laminate material package.

6. The battery pack according to claim 3, wherein a circumferential surface of the top cover inserted into the hard laminate material package and a bonding layer constituting the inner surface of the hard laminate material package are joined by heat bonding.

7. The battery pack according to claim 1, wherein a space between the battery element and the first cover contains a hot melt.

8. A method of manufacturing a battery pack having a battery element for a secondary battery, the method comprising:
    joining a circuit board to a lead of the battery element housed in a hard laminate material package having a first opening and a second opening and having a construction in which a hard laminate material is stacked on an inner soft laminate material wherein the inner soft laminate material includes, from an inner side in contact with the hard laminate material, a bonding layer, a soft aluminum metal layer, and a resin layer in a stacked arrangement;
    covering the circuit board with a top cover made by resin molding in a perpendicular direction in relation to a planar surface of the circuit board;
    engaging the top cover with a holder while supporting the circuit board by the holder from an open side of the top cover;
    inserting the top cover and the holder through the first opening into an inner space of the hard laminate material package by turning the top cover and the holder engaged together substantially by 90° while bending the lead;
    inserting a back cover into the inner space of the hard laminate material package though the second opening; and
    joining the top cover and the back cover to the hard laminate material package.

9. A method of manufacturing a battery pack having a battery element for a secondary battery, the method comprising:
    joining a circuit board to a lead of the battery element housed in a hard laminate material package having a first opening and a second opening and having a construction in which a hard laminate material is stacked on an inner soft laminate material wherein the inner soft laminate material includes, from an inner side in contact with the hard laminate material, a bonding layer, a soft aluminum metal layer, and a resin layer in a stacked arrangement;
    covering the circuit board with a top cover made by resin molding in a perpendicular direction in relation to a planar surface of the circuit board;
    engaging the top cover with a holder while supporting the circuit board by the holder from an open side of the top cover;
    inserting the top cover and the holder though the first opening into an inner space of the hard laminate material package by turning the top cover and the holder engaged together substantially by 90° while bending the lead;
    inserting a back cover into the inner space of the hard laminate material packagethrough the second opening;
    joining the top cover to the hard laminate material package; and
    joining the top cover to the hard laminate material package by using adhesive or hot melt.

10. A method of manufacturing a battery pack having a battery element for a secondary battery, the method comprising:

joining a circuit board to a lead of the battery element housed in a hard laminate material package having a first opening and a second opening at both ends and having a construction in which a hard laminate material is stacked on an inner soft laminate material wherein the inner soft laminate material includes, from an inner side in contact with the hard laminate material, a bonding layer, a soft aluminum metal layer, and a resin layer in a stacked arrangement;

covering the circuit board with a top cover made by resin molding in a perpendicular direction in relation to a planar surface of the circuit board;

engaging the top cover with a holder while supporting the circuit board by the holder from an open side of the top cover;

inserting the top cover and the holder through the first opening into an inner space of the hard laminate material package by turning the top cover and the holder engaged together substantially by 90° while bending the lead;

inserting a back cover into the inner space of the hard laminate material package through the second opening;

joining the top cover to the hard laminate material package; and inserting a back cover formed by resin or hot melt from the second opening into an internal space of the hard laminate material package.

11. The method of manufacturing a battery pack according to claim 10, further comprising bending the lead along the contour of a circumference of the holder inserted into the hard laminate material package.

12. A method of manufacturing a battery pack having a battery element for a secondary battery, the method comprising:

housing the battery element into a soft inner laminate material;

joining a circuit board to a lead of the battery element;

assembling the circuit board in a first cover;

mounting on a hard laminate material in an open state, the first cover having the circuit board assembled therein and a second cover disposed on a second end of the battery element; and surrounding the first cover and the second cover and the battery element by the hard laminate material and joining end portions of the hard laminate material together, as well as the inner surface of the hard laminate material to the circumferential surfaces of the first and second covers wherein the inner soft laminate material includes, from an inner side in contact with the hard laminate material, a bonding layer, a soft aluminum metal layer, and a resin layer in a stacked arrangement.

13. The method of manufacturing a battery pack according to claim 12, wherein the first cover further comprises a top cover and a holder each made by resin molding, and wherein the board assembling process further comprises:

covering the circuit board with the top cover in a perpendicular direction in relation to a planar surface of the circuit board;

engaging the top cover with the holder while supporting the circuit board by the holder from an open side of the top cover; and turning the top cover and the holder engaged together substantially by 90°.

14. The method of manufacturing a battery pack according to claim 12, wherein the hard laminate material comprises a bonding layer, a metal layer, and a surface protective layer successively stacked on one another, wherein the metal layer is made hard enough to maintain its shape and is resistant against deformation caused by an external force.

\* \* \* \* \*